United States Patent [19]

Dottermans

[11] Patent Number: 4,950,317
[45] Date of Patent: Aug. 21, 1990

[54] AIR FILTER ASSEMBLY AND METHOD OF PUTTING FILTER ELEMENT IN SAME

[75] Inventor: Jos Dottermans, Bertem, Belgium

[73] Assignee: Donaldson Company, Inc., Bloomington, Minn.

[21] Appl. No.: 295,258

[22] Filed: Jan. 9, 1989

[51] Int. Cl.$^5$ .............................................. H01D 35/30
[52] U.S. Cl. .......................................... 55/337; 29/235; 55/498; 55/502
[58] Field of Search ................ 55/337, 416, 432, 498, 55/502; 29/235

[56] References Cited

U.S. PATENT DOCUMENTS

| | | | |
|---|---|---|---|
| 2,744,524 | 5/1956 | Whipple | 128/206.17 |
| 3,016,984 | 1/1962 | Getzin | 55/492 |
| 3,319,404 | 5/1967 | Lowther | 55/432 |
| 3,385,039 | 5/1968 | Burke et al. | 55/501 |
| 3,429,108 | 2/1969 | Larson | 55/432 |
| 3,508,383 | 4/1970 | Humbert, Jr. et al. | 55/337 |
| 3,535,853 | 10/1970 | Brown et al. | 55/432 |
| 3,616,618 | 11/1971 | Gronholz et al. | 55/432 |
| 3,672,130 | 6/1972 | Sullivan et al. | 55/432 |
| 3,969,095 | 7/1976 | Kurahashi | 55/350 |
| 4,020,783 | 5/1977 | Anderson et al. | 55/502 |
| 4,073,632 | 2/1978 | Reinauer et al. | 55/374 |
| 4,074,985 | 2/1978 | Willas | 55/498 |
| 4,133,661 | 1/1979 | Strnad | 55/497 |
| 4,135,899 | 1/1979 | Gauer | 55/482 |
| 4,148,732 | 4/1979 | Burrow et al. | 210/232 |
| 4,151,095 | 4/1979 | Wright | 210/443 |
| 4,157,902 | 6/1979 | Tokar | 55/385 B |
| 4,159,197 | 6/1979 | Schuler et al. | 55/379 |
| 4,162,905 | 7/1979 | Schuler | 55/337 |
| 4,174,204 | 11/1979 | Chase | 55/283 |
| 4,199,334 | 4/1980 | Berkhoel | 55/304 |
| 4,204,846 | 5/1980 | Brenholt | 55/272 |
| 4,209,310 | 6/1980 | Berkhoel | 55/273 |
| 4,211,543 | 7/1980 | Tokar et al. | 55/485 |
| 4,218,227 | 8/1980 | Frey | 55/302 |
| 4,252,591 | 2/1981 | Rosenberg | 156/203 |
| 4,261,710 | 4/1981 | Sullivan | 55/96 |
| 4,278,455 | 7/1981 | Nardi | 55/498 |
| 4,304,580 | 12/1981 | Gehl et al. | 55/482 |
| 4,314,832 | 2/1982 | Fox | 55/482 |
| 4,345,922 | 8/1982 | Grassel | 55/302 |
| 4,350,509 | 9/1982 | Alseth et al. | 55/337 |
| 4,369,113 | 1/1983 | Stifelman | 210/440 |
| 4,443,235 | 4/1984 | Brenholt et al. | 55/218 |
| 4,446,019 | 5/1984 | Robinson | 210/223 |
| 4,452,616 | 6/1984 | Gillingham et al. | 55/302 |
| 4,460,390 | 7/1984 | Alseth et al. | 55/323 |
| 4,482,368 | 11/1984 | Roberts | 55/502 |
| 4,491,460 | 1/1985 | Tokar | 55/337 |
| 4,498,914 | 2/1985 | Ericksen | 55/480 |
| 4,507,203 | 3/1985 | Johnston | 210/445 |
| 4,588,426 | 5/1986 | Virgille et al. | 55/337 |
| 4,595,401 | 6/1986 | Witchell | 55/385 B |
| 4,613,348 | 9/1986 | Natale | 55/318 |
| 4,615,800 | 10/1986 | Stifelman et al. | 210/132 |

FOREIGN PATENT DOCUMENTS

| | | |
|---|---|---|
| 247762 | 5/1963 | Australia ........................ 55/337 |
| 1100544 | 5/1981 | Canada . |
| 1118369 | 2/1982 | Canada . |
| 2824280 | 12/1978 | Fed. Rep. of Germany ........ 55/498 |
| 1278115 | 10/1961 | France ........................ 55/337 |
| 55-12294 | 4/1980 | Japan . |
| 2013521 | 8/1979 | United Kingdom . |
| 1602399 | 11/1981 | United Kingdom . |
| 2112663 | 7/1985 | United Kingdom . |

Primary Examiner—Jay H. Woo
Assistant Examiner—C. Scott Bushey
Attorney, Agent, or Firm—Merchant, Gould, Smith, Edell, Welter & Schmidt

[57] ABSTRACT

A two-piece, snap-together air filter support arrangement is provided for suspending an air filter element in a filter housing. The air filter support arrangement includes an upper-pot member, an under-pot member and an engagement mechanism for releasably engaging the upper-pot member, to the under-pot member. In use, an air filter element is disposed in an annular passage between the upper-pot member and the under-pot member. The air filter support arrangement is secured within the filter housing, during use.

16 Claims, 3 Drawing Sheets

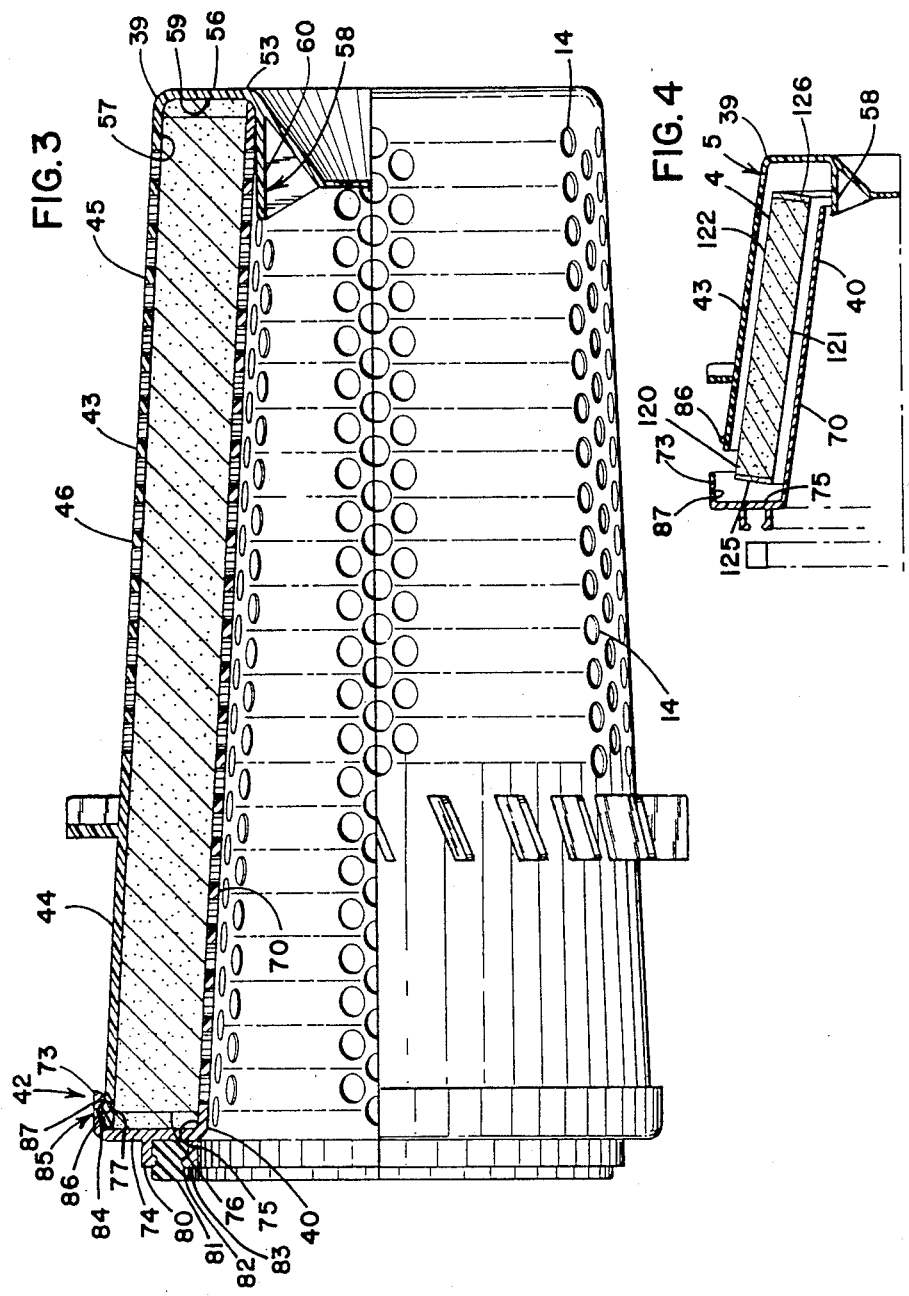

AIR FILTER ASSEMBLY AND METHOD OF PUTTING FILTER ELEMENT IN SAME

FIELD OF THE INVENTION

The present invention relates generally to air filter assemblies, and more particularly to a snap-together air filter support arrangement for supporting an air filter element in a filter housing. The present invention relates further to a method of suspending a filter element in a filter housing, using a preferred air filter support arrangement.

BACKGROUND OF THE INVENTION

Air filters serve an important function in the efficient performance of the equipment in which they are used. In an engine, for example, air filters affect fuel efficiency and engine life. A clogged air filter inhibits air passage, thereby preventing fuel and air from mixing at an optimal fuel/air ratio for combustion. A dirty air filter is weakened by the trapped particles and may tear more easily than a clean air filter, thereby leaving a hole through which particles may pass with the air flow. Particles entrained in the air flow reduce the power produced by combustion of the fuel/air mixture. Further, engine parts and seals may be damaged due to abrasion from the entrained particles.

Since the results of running an engine or other equipment with a dirty air filter are undesirable, it is advantageous to replace the air filter element relatively frequently. It is, therefore, preferable that the filter element be relatively inexpensive and relatively simple to replace.

Typically, air filter elements require a support arrangement for suspending a filter element in an air flow passage. The support arrangement is generally designed to add stability to the filter element to prevent the element from deforming, since deformation may weaken or damage the element. One common configuration for a support arrangement includes inner and outer, typically co-axial, perforated sleeve portions, between which a filter element is disposed. A closure or end cap typically covers substantially the entire arrangement at one end. Also, generally an annular end cap covers the annular ring of exposed filter element at an opposite end of the assembly. Typically, the sleeve portions or components are made from metal and machining is frequently required to remove burrs, hooks and/or bumps which might otherwise damage the filter element. Welding is generally required to join seams on the sleeve portions.

Such configurations are sometimes disadvantageous because they may be relatively expensive to produce, in part because there is a substantial number of components and several production steps may be required to assemble the components. Further, machining and welding add steps (and typically time and expense) to the production process. Also, since the filter element is relatively inconvenient to remove from this configuration, the user may be less inclined to replace it as often as could be proper.

At least for the above reasons, a filter element support and design with fewer steps in the production process and with a more convenient means of replacing a filter element would be desirable.

SUMMARY OF THE INVENTION

The present invention provides a readily assembleable, two-piece, snap-together air filter support arrangement for securing a filter element in a filter housing. Individual components of the preferred support arrangement are suitable for manufacture by injection-molding as a plastic material.

The filter support arrangement includes an under-pot member and an upper-pot member. In the preferred embodiment, the under-pot member and the upper-pot member are substantially co-axial and, when combined, define an annular space between them, for operative receipt a filter element. The under-pot member and the upper-pot member each include a sleeve portion or liner. The under-pot member includes a resilient lip member or tang generally parallel to, and spaced apart from, the under-pot member sleeve portion. The arrangement further includes an engagement means adapted for snap-fitting the upper-pot member to the resilient lip member or tang of the under-pot member. The preferred engagement means comprises first and second engagement members or pieces, with the upper-pot member including a first one of the engagement members and the under-pot member including a second one of the engagement members. In the preferred embodiment, the first engagement member is a circumferential bead positioned on the upper-pot member and the second engagement member is a circumferential recess on the under-pot member, oriented for receipt of the circumferential bead, during engagement.

In the preferred embodiment, the upper-pot member includes the cap or end piece which covers or encloses one end of the support assembly. The cap or end piece of the upper-pot member includes an internal retaining member or lip, which forms a recess with the upper-pot member outer sleeve portion for receiving one end of the filter element. The preferred internal retaining member is an annular rim.

The preferred under-pot member includes the ring-like or annular cap or end piece covering substantially only the annular area between the inner and outer sleeve portions at the opposite end of the assembly from the end cap of the upper-pot member. The preferred annular cap defines an exit aperture or port for air flow from the support assembly.

In use, the support arrangement includes a filter element disposed between the sleeve portions or liners of the upper-pot member and under-pot member. A resin or polymer is typically used as a sealant between the ends of the filter element and the support arrangement. The filter element is typically a pleated filter paper, although it can be another appropriate filter material.

Typically, the support arrangement is contained in a filter housing or can through which air to be filtered passes. The typical housing includes a cylindrical wall or sleeve portion, a closure cap or end piece at a first end and a second cap or end piece at an opposite end. In the preferred embodiment, an annular cavity is formed between the wall of the filter housing and the sleeve portion of the upper-pot member of the support arrangement. The filter housing includes a first aperture for fluid flow communication with this annular cavity, and a second aperture for fluid flow communication with a second cavity defined by the sleeve portion of the under-pot member. An air flow directing means directs air flow in a preferred path through the annular cavity. In the preferred embodiment, this air flow directing means includes a plurality of fins spaced around the sleeve portion of the upper-pot member. The fins lie in a plane skewed in relation to a radial plane of the first sleeve. This orientation facilitates a radial velocity component in the air flow causing air to spiral around the support assembly.

The typical filter housing includes fastening or securing means for supplying an axial load to secure the filter support arrangement within the filter housing. In one of the embodiments described in detail below, the fastening means includes a latch on the cylindrical wall of the filter housing. In an alternate embodiment, the fastening means includes a threaded member with a wing nut. For this alternate embodiment, the closure cap portion of the filter support arrangement includes a recessed area for accommodating the wing nut. The center area of the recessed area includes an aperture, for receiving a threaded member which is engaged by the wing nut. Further, the second end cap of the filter housing includes a similarly recessed area for accommodating the wing nut.

A seal is preferably formed between the air filter support arrangement and the filter housing by a gasket or O-ring arrangement. In the preferred embodiment, the annular end cap of the support arrangement includes gasket-receiving means. Preferably, the gasket-receiving means also includes a positive stop or stopping edge portion to ensure that the gasket will not be overcompressed when an axial load is exerted on the support arrangement, for example by operation of the fastening means of the filter housing. In typical use, the stopping edge portion abuts the filter housing.

In typical use of the preferred embodiment, air enters the first aperture in the wall of the filter housing and passes into an annular cavity defined between the wall of the filter housing and an outer sleeve portion of the support arrangement. Preferably, the outer sleeve portion is a sleeve portion of the upper-pot member, and is imperforate in the area opposite the inlet aperture in the wall of the filter housing, so that air flow is diverted axially along the assembly. The air flow is further guided in this direction by an air flow directing means. The air flow directing means in the preferred embodiment comprises a plurality of fins, spaced around the periphery of the sleeve portion of the upper-pot member.

The air next passes through perforations in the sleeve portion of the upper-pot member and through the filter element. Filtered air then passes through perforations in the sleeve portion of the under-pot member, and into the cavity defined by the sleeve portion of the under-pot member. The air passes out of the filter housing through the second aperture in the end cap of the filter housing.

In the preferred embodiment, the sleeve portions of the under-pot member and upper-pot member are substantially frusto-conical, and arranged so that the cross-sectional area of the air inflow passage increases in the direction of air flow in the annular in-flow passage and axially along the assembly. This facilitates substantial air flow further along the annular passage, before passage through the filter element. In this way, more efficient and uniform use of a greater length of the filter is achieved.

While the invention has been described in an embodiment for use with air flow from an outside of a filter element toward an inside thereof, many of the principles of the present invention can be applied with different, for example opposite, flow patterns. A variety of air flow directing means could be used to facilitate different patterns.

The present invention further includes a method of preparing the above-described assembly for use. To assemble the preferred embodiment, a filter element is placed between the sleeve portions of the upper and under-pot members. The upper-pot member and the under-pot member are snapped together to secure the filter element, and a gasket is snapped into place in a recess on the upper-pot members. The assembly is inserted in the filter housing. Generally, a housing end cap is then secured to the second end of the filter housing.

Costs for use of the preferred embodiment of the present can be kept relatively low, since relatively few assembly steps are required. Once assembled, replacement of the filter element is relatively simple, since the upper and under-pot members can readily be unsnapped to remove the filter element or paper. For the preferred, plastic, embodiment, no metal-working is necessary to remove burrs that would otherwise damage the filter element. Also, since the elements are made of plastic, they can be made relatively lightweight and easy to handle.

It is to be understood that while certain specific embodiments to the present invention are illustrated as described herein, the invention is not to be limited to the specific forms or arrangement of parts herein described and shown.

The drawings constitute a part of the specification and illustrate preferred embodiments of the invention. It will be understood that in some instances relative component sizes and material thicknesses may be shown exaggerated, to facilitate explanation.

BRIEF DESCRIPTION OF THE DRAWINGS

In the drawings, wherein like reference numerals indicate corresponding parts throughout the several views.

FIG. 3 is a side elevational view of a filter support arrangement of the preferred embodiment, generally analogous to the filter support arrangement shown in the housing of FIG. 1.

FIG. 4 is a reduced, fragmentary, exploded, schematic, side-elevational, cross-sectional view of a filter support arrangement generally analogous to the air filter support arrangement shown in FIG. 3.

DETAILED DESCRIPTION OF THE INVENTION

Figure 1:
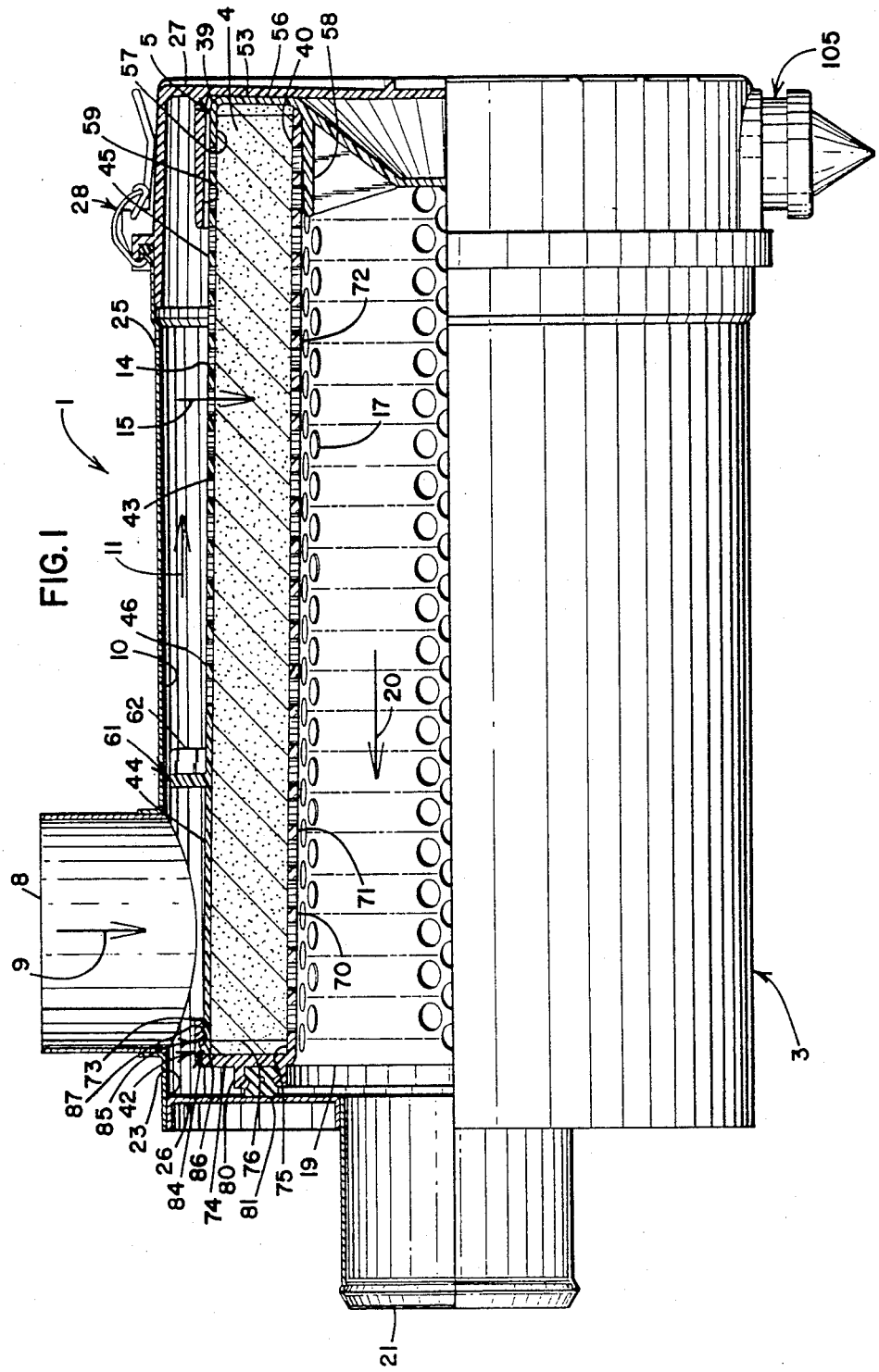
FIG. 1 is a side elevational view of a filter housing with a filter support arrangement suspended therein according to the present invention, and with portions of the housing shown in cross section; a partial sectional view of the filter support arrangement is shown.

The reference numeral 1, FIG. 1, generally designates an air filter assembly according to the present invention. Generally, the air filter assembly 1 includes a filter housing 3, an air filter element 4, and an air filter support arrangement 5 that suspends the air filter element 4 within the filter housing 3. It is noted that while a one-piece element 4 is shown, the support arrangement 5 of the present invention may be used with a variety of types of filter elements.

In typical use, air with particles entrained therein generally flows into the filter housing 3 through a first port or aperture 8 in the direction indicated by a first arrow 9. The air is then guided along first annular passage 10 generally in the direction indicated by arrow 11, i.e. axially along the arrangement 5. Perforations 14 in a portion of the air filter support arrangement 5 allow the air to enter the filter element 4. As the air passes through the filter element 4, generally in the direction of arrow 15, particles in the air are retained by the filter element 4. Relatively particle-free air then passes through second perforations 17 in a portion of the air filter support arrangement 5 and into a second air passage 19. The air flows through the second air passage 19 generally in the direction of arrow 20, before exiting the filter housing 3 through a second aperture or port 21.

The filter housing 3, as shown in FIG. 1, defines a cavity 23 in which the air filter element 4 is suspended and through which air to be filtered is passed. It consists primarily, though not necessarily exclusively, of three portions: a tubular wall 25, a first annular end cap 26, and a second end cap 27. In the preferred embodiment, the cylindrical wall 25 includes the first aperture 8, and the first annular end cap 26 includes the second aperture 21.

The filter housing 3 includes a fastening means 28 for securing the second end cap 27 and supplying an axial force to secure a filter support arrangement 5 within the filter housing 3. It will be understood that a variety of seal means, not shown, can be used to ensure a good seal between end cap 27, and housing wall 25.

The filter element 4 is suspended in the filter housing 3 by the air filter support arrangement 5, which includes an upper-pot member 39, and an under-pot member 40. The members 39 and 40 are secured to one another by engagement mechanism 41 including an engagement means 42.

In the preferred embodiment, as best shown in FIG. 3, the upper-pot member 39 includes a first elongate tubular sleeve portion 43 having a first end portion 44, a second end portion 45 and a middle portion 46. The first sleeve portion 43 is preferably imperforate at its first end portion 44, but includes perforations 14 throughout the middle portion 46 and the second end portion 45. The perforations 14 shown in FIG. 3 are circular, but it will be understood that this invention does not require that the perforations 14 be circular.

The preferred upper-pot member 39, FIG. 3, includes a closure cap portion 53 proximate the second end portion 45 of the first sleeve portion 43. The closure cap portion 53 includes an end cover portion 56 which encloses a tubular passage 57 defined by the first sleeve portion 43. In other words, the second end portion 45 of the first sleeve portion 43 is capped by end cover portion 56. The closure cap portion 53 further includes an internal retaining member 58. The retaining member 58 and the first sleeve portion 43 form a recess 59 therebetween for operational receipt of the filter element 4. The preferred retaining member 58 is in the form of an annular rim 60.

The first annular air passage 10, FIG. 1, is defined by the first sleeve portion 43 of the upper-pot member 39 and the cylindrical wall 25 of the filter housing 3. In use, air is directed axially along the passage 10 by an air flow directing means 61 which, in the preferred embodiment, includes a plurality of fins 62.

The preferred under-pot member 40 includes the second elongate tubular sleeve portion 70, having perforations 17 throughout. The second sleeve portion 70 has a first end portion 71 and a second end portion 72. The second air passage 19 is defined by the second sleeve portion 70 of the under-pot member 40. The under-pot member 40 further includes a resilient lip member 73, spaced from the sleeve portion 70 and extending substantially parallel thereto.

In the preferred embodiment, as best illustrated in FIG. 3, the under-pot member 40 further includes an annular end flange 74 which substantially covers, and receives thereagainst, one annular end of the filter element 4. The lip member 73 and the second sleeve portion 70 define an annular recess 75 for receiving an end 76 of the filter element 4 in use. When assembled, the first sleeve portion 43 and the second sleeve portion 70 define an annular passage 77 therebetween for operational receipt of a filter element 4.

The annular end flange 74 includes a gasket-receiving means 80 in which a gasket 81 is releasably secured in use. The gasket receiving-means 80 comprises a member 82 including a stopping edge portion 83 which abuts the filter housing 3 to prevent overcompression of the gasket 81, when the fastening means 28 of the filter housing 3 is engaged to secure the air filter support arrangement 5 within the filter housing 3, FIG. 1.

The filter support arrangement 5, according to this invention, further includes engagement means 42, comprising first engagement member 84 and second engagement member 85, for selectively securing the upper-pot member 39 to the under-pot member 40. The upper-pot member 39 includes one of the engagement members and the under-pot member 40 includes the other of the engagement members. In the preferred embodiment, the first engagement member is a circumferential bead 86 on the first end portion 44 of the upper-pot member 39. The second engagement member is a circumferential recess 87 on the resilient lip member 73 of the under-pot member 40. The bead 86 and recess 87 are oriented for a secure, resistance, fit; i.e. to snap the upper-pot member 39 and under-pot member 40 together during use.

Figure 2:
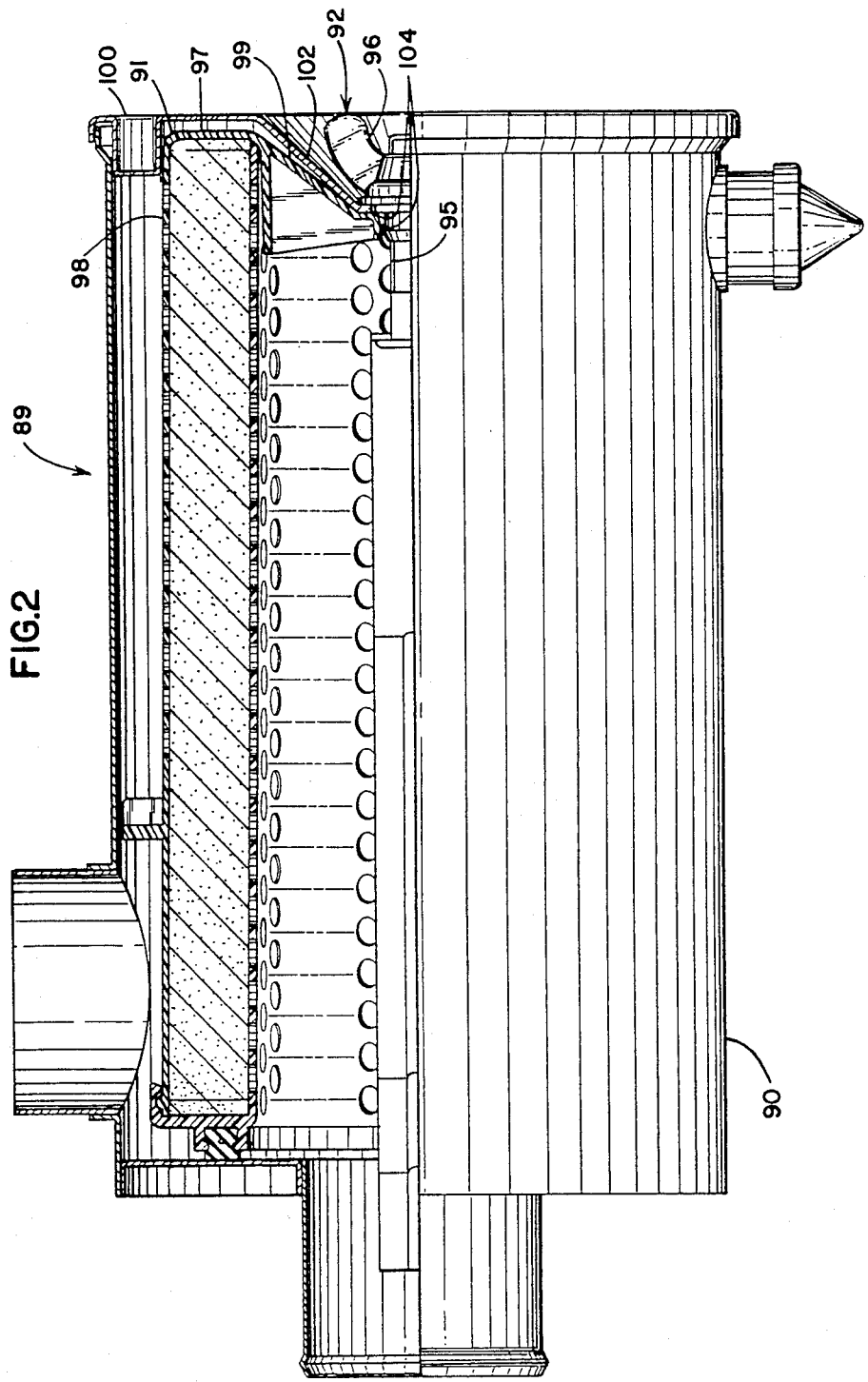
FIG. 2 is analogous to FIG. 1, wherein an alternate filter housing is shown with a filter support arrangement, similar to that shown in FIG. 1, supported therein; the support arrangement of FIG. 2 differing from FIG. 1 primarily with respect to features for mounting by wingnut.

FIG. 2 shows an alternate embodiment of an air filter assembly 89 according to this invention. It is substantially similar to that shown in FIG. 1 and discussed above. An alternate fastening means 92, however, is incorporated, and the filter housing 90 and the air filter support arrangement 91 are modified accordingly. The alternate fastening means 92 includes a threaded member or post 95 and a wing nut 96. An alternate closure cap portion 97 of upper-pot member 98 includes a recessed area 99, and an alternate second end cap 100 of filter housing 90 includes a recessed area 102 to accommodate the wing nut 96. The recessed areas, 99 and 102, define apertures 104 generally centrally located to accommodate the threaded member 95. By comparisons of FIGS. 1 and 2 it will be understood that with only minor modifications, air filter support arrangements according to the present invention may be incorporated into a variety of housings. It will also be understood that, except as described above, the assembly 89 of FIG. 2 is substantially the same as assembly 1 of FIG. 1, and further detail will not be given.

As shown in FIG. 1, the preferred assembly 1 includes a dust valve 105, which allows dust particles that pass the entire length of passage 10 to be discharged from the assembly 1. Centrifugal force and gravity draw particles at the end of recess 10 toward the valve 105. In this manner, the dust valve 105 aids in preventing particles from becoming trapped in recess 10 proximate second end cap 27.

This invention also concerns a method of assembling a filter assembly such as assembly 1. This method facilitates a relatively simple, snap-together assembly to suspend an air filter member 4 in a filter housing 3. To assemble the preferred embodiment, as best illustrated in FIG. 4, a first end portion 120 of the filter element 4 is placed in the recess 75 between the second sleeve portion 70 and the resilient lip member 73 of the under-pot member 40, such that the second sleeve portion 70 is adjacent the internal surface 121 of filter element 4. Next, the upper-pot member 39 is positioned about the filter element, such that the first sleeve portion 43 is adjacent the outside surface 122 of the filter element 4, and the second sleeve portion 70 of the under-pot member 40 is received between the internal retaining member 58 of the upper-pot member 39 and the first sleeve portion 43 of the upper-pot member 39. It is noted that typically sealant (not shown) will have been applied to the ends 125 and 126 of the air filter element 4 to prevent the element 4 from moving within the air filter support arrangement 5, and to ensure proper filter element conformation. Circumferential bead 86 on the upper-pot member 39 securely engages the circumferential recess 87 on the under-pot member 40, preventing unintended movement of the air filter element 4.

The assembled air filter support arrangement 5 is then secured inside a filter housing 3, for example as shown in FIG. 1. To effect this, second end cap 27 is removed, and the air filter support arrangement 5 is inserted into the filter housing 3. A gasket 81 abuts the first annular end cap 26 of the filter housing 3. The filter housing 3 is closed with second end cap 27. Fastening means 28 is engaged to supply an axial load or force between the second end cap 27 and the first annular end cap 26 of the filter housing. This axial load causes gasket 81 to deform until stopping edge 83 abuts the first annular end cap 26 of the filter housing 3.

It will be understood that the present invention may be embodied in a variety of forms. The above descriptions, therefore, are not to be interpreted as limiting, but rather as a basis for the claims and as a basis for teaching persons skilled in the art the invention, which is defined by the following claims.

What is claimed is:

1. An air filter support arrangement defining an annular space to receive a filter element comprising:
   (a) an upper-pot member having:
      (i) a first elongate tubular sleeve portion with first and second end portions;
      (ii) and a first annular end flange covering a first end of said annular space;
   (b) an under-pot member having:
      (i) a second elongate tubular sleeve portion with first and second end portions, said first and said second sleeve portions defining, when said arrangement is operationally assembled, said annular space therebetween;
      (ii) a second annular end flange covering a second end of said annular space; and
      (iii) a resilient lip member extending from said second end flange and being substantially parallel to said second sleeve portion, said lip member and said second sleeve portion defining a recess therebetween for operational receipt of a portion of a filter element therein; and
   (c) said resilient lip member including a first resilient engagement member; said upper-pot member including a second resilient engagement member, said first engagement member resiliently engaging said second engagement member to releasably secure said upper-pot member to said under-pot member.

2. An air filter support arrangement, according to claim 1, wherein said first engagement member comprises a circumferential bead and said second engagement member comprises a circumferential recess.

3. An air filter support arrangement according to claim 1, wherein a diameter of said second sleeve portion of said under-pot member is less than a diameter of said first sleeve portion of said upper-pot member.

4. An air filter support arrangement according to claim 1, wherein said upper-pot member includes a closure cap portion having:
   (a) an end cover portion, for covering a tubular passage defined by said first sleeve portion; and
   (b) an internal retaining member forming a recess between said internal retaining member and said first sleeve portion, for operationally receiving an end of a filter element during use.

5. An air filter support arrangement according to claim 4, wherein said internal retaining member on said closure cap portion of said upper-pot member comprises an annular rim.

6. An air filter support arrangement according to claim 1, wherein a diameter of said first end portion of said upper-pot member first sleeve portion is greater than a diameter of said second end portion of said upper-pot member first sleeve portion, such that said upper-pot member is generally frusto-conical; and a diameter of said first end portion of said under-pot member second sleeve portion, is greater than a diameter of said second end portion of said under-pot member second sleeve portion, such that said under-pot member is generally frusto-conical.

7. An air filter support arrangement comprising:
   (a) a tubular air filter element;
   (b) an upper-pot member having
      (i) a first elongate tubular sleeve portion with a first end portion and a second end portion; and
      (ii) a first annular end flange covering a first end of said filter element; and
   (c) an under-pot member having:
      (i) a second elongate tubular sleeve portion with first and second end portions, said first and said second sleeve portions defining, when said arrangement is operationally assembled, an annular space therebetween for operational receipt of said filter element; a second annular end flange covering a second end of said filter element; and
      (ii) a resilient lip member extending from said second end flange and being substantially parallel to said second sleeve portion, said lip member and said second sleeve portion defining a first annular recess therebetween for operational receipt of a portion of said filter element therein; and
   (d) said resilient lip member including a first resilient engagement member; said upper-pot member including a second resilient engagement member, said first engagement member resiliently engaging said second engagement member to releasably secure said upper-pot member to said under-pot member; and (e) said tubular filter element having first and second end portions, said first end portion received in said first annular recess defined by said resilient lip member and said second sleeve portion of said under-pot member; said second end portion received in a second annular recess defined by an internal retaining member and said first sleeve portion of said upper-pot member.

8. An air filter support arrangement according to claim 7, wherein said internal retaining member is an annular rim; and wherein said first end portion of said upper-pot member is received within said first annular recess defined by the resilient lip member and said second sleeve portion of said under-pot member; and said second end portion of said under-pot member is received within said second annular recess defined by said internal retaining member of said upper-pot member and said first sleeve portion of said upper-pot member.

9. An air filter support arrangement according to claim 7, wherein, a diameter of said first end portion of said first sleeve portion of said upper-pot member is larger than a diameter of said second end portion of said first sleeve portion of said upper-pot member, such that said upper-pot member is generally frusto-conical, and a diameter of said first end portion of said second sleeve portion of said under-pot member is larger than a diameter of said second end portion of said second sleeve portion of said under-pot member such that said under-pot member is generally frusto-conical.

10. An air filter support arrangement according to claim 7, wherein said upper-pot member includes air flow directing means projecting from a middle portion of said upper-pot member.

11. An air filter assembly comprising:
(a) an air filter support arrangement having:
  (i) an upper-pot member having:
    (1) a first elongate tubular sleeve portion having first and second end portions;
    (2) and a first annular end flange;
  (ii) an under-pot member having:
    (1) a second elongate tubular sleeve portion having first and second end portions, said first and second sleeve portions defining, when said arrangement is operationally assembled, an annular space therebetween for operational receipt of a filter element;
    (2) a second annular end flange covering a second end of said annular space; said first annular end flange on said upper-pot member covering a first end of said annular space; and
    (3) a resilient lip member extending from said second end flange and being substantially parallel to said second sleeve portion, said lip member and said second sleeve portion defining an annular recess therebetween for operational receipt of a portion of said filter element therein; and
  (iii) said resilient lip member including a first resilient engagement member; said upper-pot member including a second resilient engagement member, said first engagement member resiliently engaging said second engagement member to releasably secure said upper-pot member to said under-pot member; and
(b) a filter housing having:
  (i) a tubular wall;
  (ii) a first annular end cap; and
  (iii) a second end cap, said tubular wall and said first and second end caps defining a recess for receiving said air filter support arrangement; and
  (iv) a fastening means for securing said second end cap to said tubular wall, said securing means supplying axial force between said end caps of said filter housing.

12. An air filter assembly according to claim 11, wherein said upper-pot member includes an end covering having an aperture for receiving said fastening means, and said end cover includes a recessed area adjacent said aperture for accommodating a wing nut; and wherein said second end cap of said filter housing includes an aperture for receiving a fastening means, said second end cap including a recessed area adjacent said aperture for accommodating a wing nut.

13. An air filter assembly according to claim 11, wherein a first annular air passage is defined between said first sleeve portion of said upper-pot member and said wall of said filter housing, and a second air passage is defined by said second sleeve portion of said under-pot member; and wherein said wall of said filter housing includes a first aperture in communication with said first annular air passage, and said first annular end cap of said filter housing includes a second aperture in communication with said second air passage.

14. An air filter assembly according to claim 13, wherein said annular end flange of said under-pot member includes a gasket-receiving means.

15. An air filter assembly according to claim 14, wherein said gasket-receiving means includes a stopping edge portion which abuts said filter housing when said air filter support arrangement is secured within said filter housing.

16. A method of assembling an air filter assembly, said method including the steps of:
(a) providing an air filter support arrangement including:
  an upper-pot member having a first tubular sleeve portion and a first annular end flange; an under-pot member having a second tubular sleeve portion, a second annular end flange and a resilient lip member extending from said second annular end flange; and an engagement means for snapping said under-pot member to said upper-pot member; said first and second sleeve portions defining an annular passage therebetween and an annular recess defined by said resilient lip member and said second sleeve; and
(b) providing a filter element for receipt in said annular passage; and
(c) providing a filter housing having:
  a tubular wall, a first annular end cap, and a second end cap, said tubular wall and said first and said second end caps defining a cavity for receiving said air filter support arrangement, and a fastening means for securing said second end cap to said tubular wall, said fastening means supplying axial force between said end caps of said filter housing; and
(d) placing said filter element in said annular recess defined by said resilient lip member and said second sleeve portion of said under-pot member, such that said second sleeve portion is surrounded by said filter element; and
(e) positioning said first sleeve portion of said upper-pot member over said filter member, such that said first sleeve portion abuts said under-pot member; and (f) engaging said engagement means to secure said upper-pot member to said under-pot member; and (g) placing the assembled air filter support arrangement with said filter element therein in said cavity defined by said tubular wall and said first and said second end caps of said filter housing; and (h) securing said air filter support arrangement within said filter housing.

* * * * *

UNITED STATES PATENT AND TRADEMARK OFFICE
CERTIFICATE OF CORRECTION

PATENT NO. : 4,950,317

DATED : August 21, 1990

INVENTOR(S) : Jos Dottermans

It is certified that error appears in the above-identified patent and that said Letters Patent is hereby corrected as shown below:

Front page and Col. 1, title: "Putting" should be --Potting--.

Col. 1, line 40
    "deforminq" should be --deforming--.

Col. 7, line 51
    after "space" insert --shaped--.

Signed and Sealed this

Seventeenth Day of March, 1992

Attest:

HARRY F. MANBECK, JR.

Attesting Officer

Commissioner of Patents and Trademarks